United States Patent
Thomas et al.

(10) Patent No.: US 9,810,596 B2
(45) Date of Patent: Nov. 7, 2017

(54) LEAK DETECTION IN COMPOSITE STRUCTURES

(71) Applicant: The Boeing Company, Chicago, IL (US)

(72) Inventors: Charles William Thomas, Issaquah, WA (US); Kenneth M. Dull, Puyallup, WA (US)

(73) Assignee: THE BOEING COMPANY, Chicago, IL (US)

( * ) Notice: Subject to any disclaimer, the term of this patent is extended or adjusted under 35 U.S.C. 154(b) by 598 days.

(21) Appl. No.: 14/168,316

(22) Filed: Jan. 30, 2014

(65) Prior Publication Data

US 2015/0090005 A1   Apr. 2, 2015

Related U.S. Application Data

(60) Provisional application No. 61/885,153, filed on Oct. 1, 2013.

(51) Int. Cl.
*G01M 3/04* (2006.01)
*G01M 3/38* (2006.01)

(52) U.S. Cl.
CPC ............ *G01M 3/04* (2013.01); *G01M 3/047* (2013.01); *G01M 3/38* (2013.01)

(58) Field of Classification Search
CPC .......... G01M 3/04; G01M 3/047; G01M 3/38
USPC ............................................................ 73/40
See application file for complete search history.

(56) References Cited

U.S. PATENT DOCUMENTS

| | | | |
|---|---|---|---|
| 5,359,887 A | 11/1994 | Schwab et al. | |
| 5,612,492 A | 3/1997 | Schwab et al. | |
| 7,849,729 B2 | 12/2010 | Miller et al. | |
| 8,197,623 B1* | 6/2012 | Westerman | G01M 3/002 |
| | | | 156/64 |
| 8,215,154 B2 | 7/2012 | Toledo Garcia | |
| 8,438,909 B2 | 5/2013 | Miller et al. | |
| 8,505,361 B2 | 8/2013 | Miller et al. | |
| 2010/0170326 A1* | 7/2010 | Miller | G01M 3/38 |
| | | | 73/49.3 |
| 2011/0259086 A1 | 10/2011 | Harris et al. | |
| 2014/0116610 A1* | 5/2014 | Thomas | B32B 37/10 |
| | | | 156/250 |

OTHER PUBLICATIONS

Extended European Search Report, dated Mar. 11, 2015, regarding Application No. EP14187127.7, 6 pages.
"Composite Repair," Hexcel Composites, Publication No. UTC 102, Apr. 1999, 14 pages. http://www.hexcel.com/Resources/DataSheets/Brochure-Data-Sheets/Composite_Repair.pdf.
Canadian Intellectual Property Office Communication, dated Mar. 10, 2017, regarding Application No. 2,859,239, 8 pages.

* cited by examiner

*Primary Examiner* — Hezron E Williams
*Assistant Examiner* — David Z Huang
(74) *Attorney, Agent, or Firm* — Yee & Associates, P.C.

(57) ABSTRACT

A leak through the thickness of a structure is detected from one side of the structure using a leak detection layer. The leak detection layer exhibits visually observable changes when exposed to an air leak.

5 Claims, 7 Drawing Sheets

LEAK DETECTION IN COMPOSITE STRUCTURES

CROSS REFERENCE TO RELATED APPLICATIONS

This application claims the benefit of Provisional U.S. Patent Application No. 61/885,153 filed Oct. 1, 2013, which is incorporated by reference herein in its entirety.

BACKGROUND INFORMATION

Field

The present disclosure generally relates to techniques for reworking structures, and deals more particularly with a method of detecting leaks and reworking composite laminate structures.

Background

Localized areas of composite structures sometimes need to be reworked in order to eliminate non-conformities, including inconsistencies and undesired alterations. These non-conformities may be created either during manufacturing, or after the structure has been placed in service. For example, composite laminate skins used on aircraft airframes sometimes experience impact damage caused by an impact with a foreign object during flight, or contact with service vehicles and equipment while on the ground.

Currently, in order to eliminate a non-conformity in a composite laminate aircraft skin, material is removed from a local area of the skin which includes and surrounds the non-conformity. In many cases, the needed material removal does not extend through the full thickness of the skin. Uncured composite material, referred to as a rework patch, is then placed over the skin and a vacuum bag is installed over the rework patch. In some cases, a pre-cured patch is installed and adhesively bonded in place. Heat is applied to the rework area in order to thermally cure the rework patch, or the bonding adhesive, following which the vacuum bag is removed and the rework area is fared-in with the existing skin. Where a non-conformity is severe or extensive, as may occur during a substantial impact with the skin, a void such as a crack or fracture may be created that extends through from the frontside to the backside of the skin. This type of through-the-thickness void represents a leak path that may allow air to be drawn into the rework area from the backside of the skin when the bag is evacuated. As a result of such leaks, air may be allowed to enter rework patch, causing undesired voids or porosities in the patch.

If an area requiring rework is determined to have a leak, or a likelihood of a leak, a vacuum bag may be applied to the backside of the structure to prevent air from reaching the rework patch through the leak path. While this approach is satisfactory in some applications, it has several disadvantages. First, the installation of a second vacuum bag on the backside of the skin is time-consuming, costly and labor intensive. Second, it is possible that the dimensions of the backside bag may not be large enough to seal off all leaks, due to the fact that some leaks can be located relatively far from the frontside area being reworked. Third, depending upon the location of the area requiring rework, it may not be possible to install a backside bag because of structural obstructions such as, for example and without limitation, where a stringer underlies the backside of the skin. In some cases, the obstruction may be disassembled to provide enough clearance for installation of a backside bag, however the disassembly process is time-consuming and labor intensive.

Accordingly, there is a need for a method of reworking a structure, such as a composite laminate skin, which permits leak detection from the frontside of the skin and which does not require access to the backside of the skin.

SUMMARY

The disclosed embodiments provide a method of testing structures such as composite laminates, for leaks that extended through the thickness of the structure. The leak detection may be performed entirely from one side of the structure, such as from the frontside of a composite laminate aircraft skin. The frontside leak detection method eliminates the need for a backside bag. The disclosed method may be employed to determine whether a void or leak path extends entirely through the thickness of the structure before any rework on the structure is carried out. By determining whether a leak exists prior to reworking the structure, a decision may be made of whether to initiate a rework process, depending upon the application. The disclosed frontside leak detection method allows rapid and definitive detection of leaks through simple visual observation of changes in a layer of leak detection material placed over the area of the structure to be tested. Visual detection of possible leaks can be enhanced using illumination of the structure with light of particular wavelengths, cameras and image processing software.

According to one disclosed embodiment a method is provided of detecting a leak through a structure. A leak detection layer is placed over an area of the structure, and a vacuum bag on the structure covering of the leak detection layer. A vacuum is then drawn in the bag, and any changes in the leak detector layer are observed. The leak detection layer is placed over a first side of the structure, and the change in the leak detector layer is performed by observing the leak detection layer from the first side of the structure. Placing the leak detection layer and sealing the vacuum bag may be performed substantially simultaneously. The method may further comprise radiating the area with light of a preselected wavelength, and observing a change in the leak detected layer is performed using a camera to detect light emitted from the area.

According to another disclosed embodiment, a method is provided of detecting a leak through a thickness of a structure in an area having a non-conformity therein. A leak detection layer is placed over a first surface of the structure within the area, and a substantially transparent vacuum bag is placed over the area covering the leak detection layer. The vacuum bag is sealed to the first surface of the structure, and a vacuum is drawn in the bag. Light of a preselected wavelength is projected onto the area, and the area is viewed with a camera adapted to record an optical change in the leak detection layer indicating a leak. The leak detection layer is responsive to exposure thereto of oxygen to change at least one optical characteristic of the leak detection layer. Projecting light onto the area and viewing the area with the camera are each performed from one side of the structure.

According to a further embodiment, a method is provided of reworking an area of a composite laminate structure having a non-conformity therein. The non-conformity is removed within the area by removing material from a frontside of the structure, and leak detection is performed from the frontside of the structure to determine whether a leak extends through the structure from the frontside to a backside of the structure. The method also includes installing a rework patch on the structure within the area, and sealing the leak from the frontside of the structure. Alternatively, sealing the leak may be performed from the backside of the structure. The leak detection may be performed by installing a leak detection layer over the area, sealing a vacuum bag over the area covering of the leak detection layer, drawing a vacuum within the vacuum bag, and observing optical changes in the leak detection layer. The method may further comprise sealing a leak in the structure.

According to still another embodiment, a method is provided of maintaining a composite laminate aircraft structure. A non-conformity is identified in an area of the structure, and a determination is made from a frontside of the structure whether a leak exists through the thickness of the structure within the area. If a leak has been determined to exist through the thickness of the structure, the material is removed from the structure within the area. The method also includes determining from the frontside of the structure whether a leak exists through the thickness of the structure within the area after the material has been removed from the structure. If a leak has determined to exist through the thickness of the structure after the material has been removed, then the leak is sealed, following which a patch is installed on the structure covering the area where the material has been removed. Determining from a frontside of the structure whether a leak exists through a thickness of the structure may be performed by placing a leak detection layer over the area, generating a vacuum beneath the leak detection the layer, and monitoring changes in the leak detection layer indicating a leak in the structure. If a leak has been determined not to exist through the thickness of the structure, then the structure may be used as-is without reworking the area. The method may also comprise placing a vacuum bag over the leak detection layer, and sealing the vacuum bag to the frontside of the structure. Monitoring changes in the leak detection layer may include radiating the area with light of a preselected wavelength, and using a camera to optically observe any changes in the leak detection layer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The disclosed embodiments relate to a method of testing a structure for leaks, and reworking the structure to reduce or eliminate non-conformities, including any leaks that may be detected. For example, referring to FIG. 1, an aircraft 20 includes a fuselage 22, a pair of wings 24 and a tail assembly 26, any of which may be covered with a structure such as a composite laminate skin 28, hereinafter sometimes also referred to as a "structure" 28 or a "composite laminate" 28. The skin 28 may contain one or more local non-conformities caused by events such as impacts which occur either while the aircraft 20 is being manufactured, or later, after the aircraft 20 has been placed in service. These non-conformities 30 may include, without limitation, inconsistencies, damage, voids, dents, cracks, fractures, to name only a few.

Figure 2:
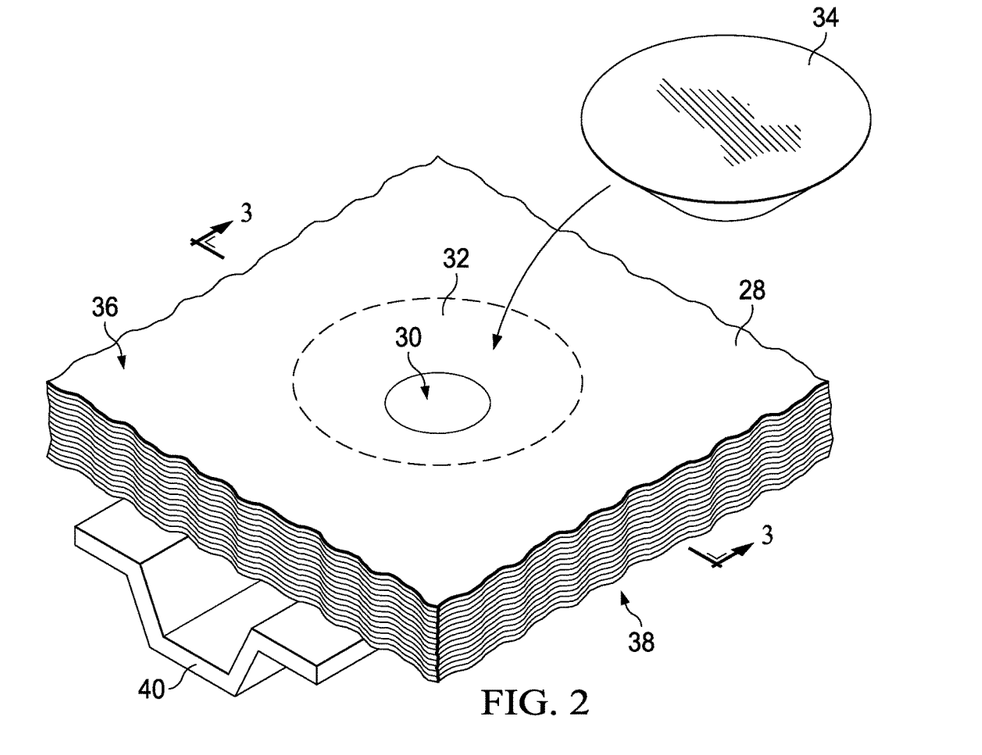
FIG. 2 is an illustration of a perspective view of the area requiring rework shown in FIG. 1, also illustrating an underlying stringer on the backside of the skin.
Figure 3:
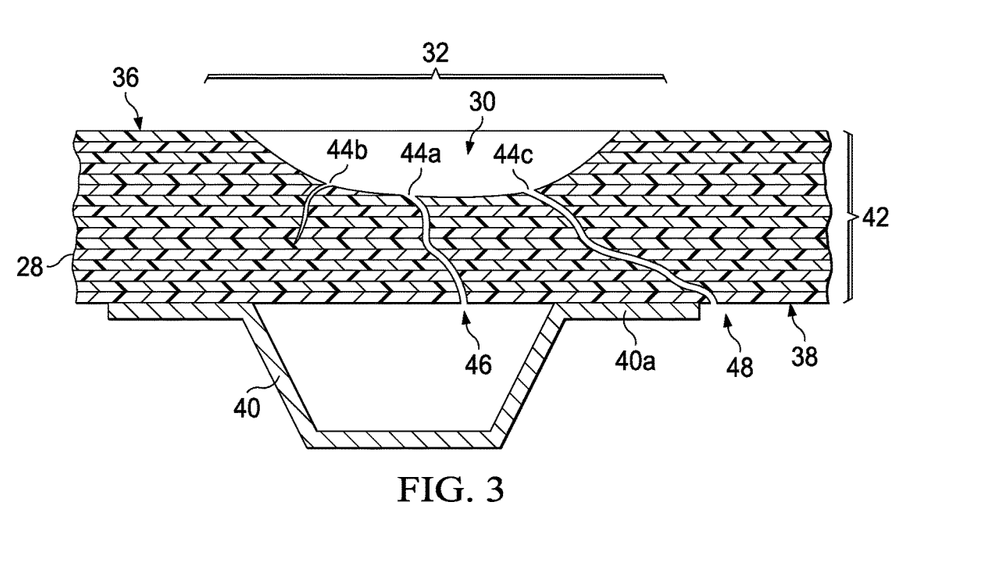
FIG. 3 is an illustration of a sectional view taken along the line 3-3 in FIG. 2.

Referring now also to FIGS. 2 and 3, in the illustrated example, the skin 28 has a frontside 36 and a backside 38, and the non-conformity 30 comprises a dent-like depression in the frontside 36 of the skin. In order to reduce or eliminate the non-conformity 30, an area 32 of the skin 28 containing the non-conformity 30, sometimes referred to hereinafter as a "rework area" 32, may be reworked and restored using a composite laminate rework patch 34 (FIG. 2). As will be discussed later in more detail, this rework process involves removing material from the skin 28 within the rework area 32 and replacing the material that has been removed with the composite patch 34. Depending upon the location of the non-conformities 30 in the skin 28, structure such as the stringer 40 shown in FIG. 2, or other obstructions may be present on the backside 38 of the skin 28, either directly beneath or immediately adjacent to the rework area 32. The presence of a structure such as the stringer 40 beneath the rework area 32 may require that the rework process be performed substantially only from the frontside 36 of the skin 28.

In some cases, the non-conformity 30 may include voids 44a, 44b, 44c such as cracks or fractures which may or may not extend through the entire thickness 42 of the skin 28. For example, as shown in FIG. 3, one void 44b extends only partially through the thickness 42 of the skin 28, while two additional voids 44a and 44c extend completely through the thickness 42 to the backside 38 of the skin 28. The voids, such as void 44c may extend laterally completely through the thickness 42 to a point 48 that is well beyond the rework area 32.

The through-the-thickness voids 44a and 44c form leakage paths which may allow air to pass from the backside of 38 of the skin 28 into the rework area 32. As will be discussed later, these leakage paths may allow air to enter the rework patch 34 as the patch 34 is being cured. Air that enters the rework patch 34 in this manner during the cure process may result in the formation of undesired voids or porosities in the rework patch 34 which may affect its strength and the performance of the rework.

In order to determine whether any voids 44 are present within the rework area 32 that extend through the entire thickness 42 of the skin 28, thus representing potential leakage paths, a leak detection procedure may be performed on the skin 28 within the rework area 32. The disclosed leak detection procedure may be performed entirely from the frontside 36 of the skin 28. Thus, the method used in the disclosed leak detection procedure may be used to detect potential leaks into the rework area 32 regardless of the presence of obstructions present on the backside 38, such as the stringer 40 which is located on the backside 38 of the skin 28 beneath the rework area 32.

Figure 4:
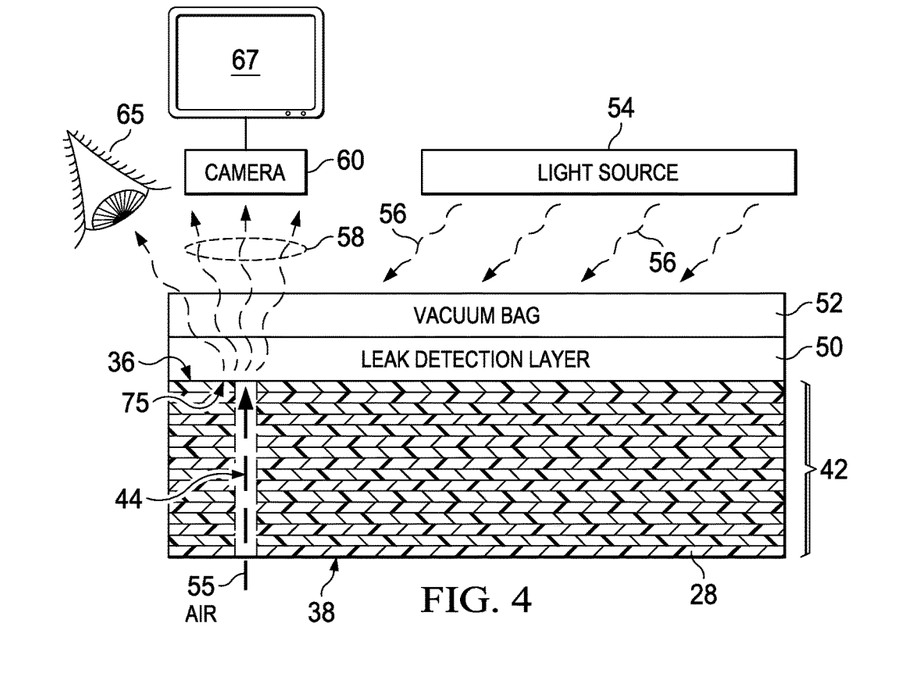
FIG. 4 is an illustration of a combined block and sectional view showing a method of detecting leaks through a structure from the frontside of the structure.
Figure 5:
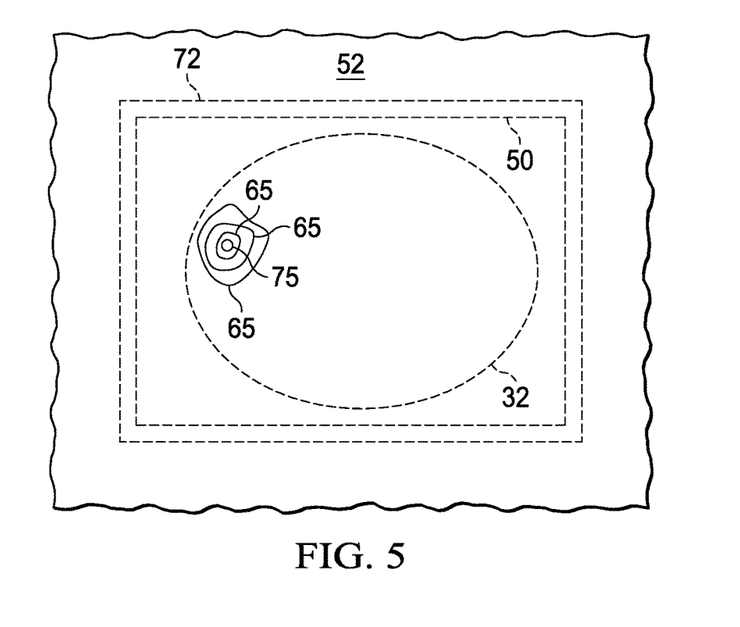
FIG. 5 is an illustration of a diagrammatic view of an image recorded by the camera in FIG. 4 showing the location of an air leak in the structure.

Attention is now directed to FIGS. 4 and 5 which diagrammatically illustrate leak detection that may be performed entirely from one side of a structure, such as the frontside 36 of the previously described composite laminate skin 28. In this example, a void 44 present in the structure 28 forms an air leak 75 that allows air 55 to leak from the backside 38 of the structure 28 to the frontside 36 thereof.

In order to perform the disclosed leak detection method, a leak detection layer (hereinafter "LDL") 50 is placed over the frontside 36 of the structure 28, within an area to be tested for leaks, such as the rework area 32 previously described. The LDL 50, discussed below in more detail, may comprise a material having properties that undergo a visually observable change when the material is exposed to a particular gas, such as oxygen contained in air 55 leaking through the void 44. The LDL 50 is covered by a substantially transparent vacuum bag 52 which is sealed around its edges by a seal 72 (FIG. 5) to the structure 28. The vacuum bag 52 isolates the LDL 50 from the surrounding ambient atmosphere at the frontside 36 of the structure 28. The vacuum bag 52 may comprise, without limitation, a flexible polymer film, such as Nylon®, Kapton® or PVA (polyvinyl alcohol) that is substantially impermeable to gases.

In one embodiment, the LDL 50 may comprise a standalone film or sheet that is independent from the vacuum bag 52. In another embodiment, the LDL 50 may comprise a film that is bonded to the vacuum bag 52, while in a further embodiment, the LDL 50 may comprise a paint-like material that is sprayed onto a surface of the vacuum bag 52. In still another embodiment, the LDL 50 may comprise a material layer that is co-extruded with the vacuum bag 52.

The LDL 50 includes a material that changes color based on the oxygen partial pressure near the LDL 50. The material may comprise, for example and without limitation luminophore molecules suspended in an oxygen permeable binder that are excited by light of a particular wavelength (e.g. blue), and then return to the ground state by emitting light of a different wavelength (e.g. red) if oxygen is present. In this example, the intensity of the emitted red light 58 is inversely proportional to the surrounding partial pressure of the oxygen. In an alternate embodiment, the LDL layer 50 may comprise light-sensitive nano-particles that detect the presence of oxygen only when they are "switched on" by incident light 56 of a particular wavelength, such as UV (ultraviolet) light from a light source 54.

As indicated above, depending upon the particular application and the material used in the LDL 50, the oxygen in the air 55 reaching the LDL 50 through the void 44 may result in a local reaction that manifests itself as a visually observable change in at least one optical characteristic, such as color, saturation level, brightness or contrast that may be detected with the naked eye 65, with or without a means of enhancement. In other applications, the LDL 50 is radiated with light 56 of a preselected wavelength, such as UV generated by the suitable light source 54. The incident light 58 causes the oxygen sensitive material in the LDL 50 around the area of the air leak 75 to luminesce, which may include either fluorescence or phosphorescence. The emitted light caused by the luminescence may be recorded by a suitable camera 60.

Images of the LDL 50 recorded by the camera 60 may be viewed on a display 67. FIG. 5 illustrates an image of a typical air leak 75 in the structure 28, corresponding to the location of the through-the-thickness void 44 shown in FIG. 4. The location of the air leak 75 may be manifested as a series of bands 65 of differing colors, brightness, contrast or color saturation levels which surround the point of the air leak 75.

Figure 1:
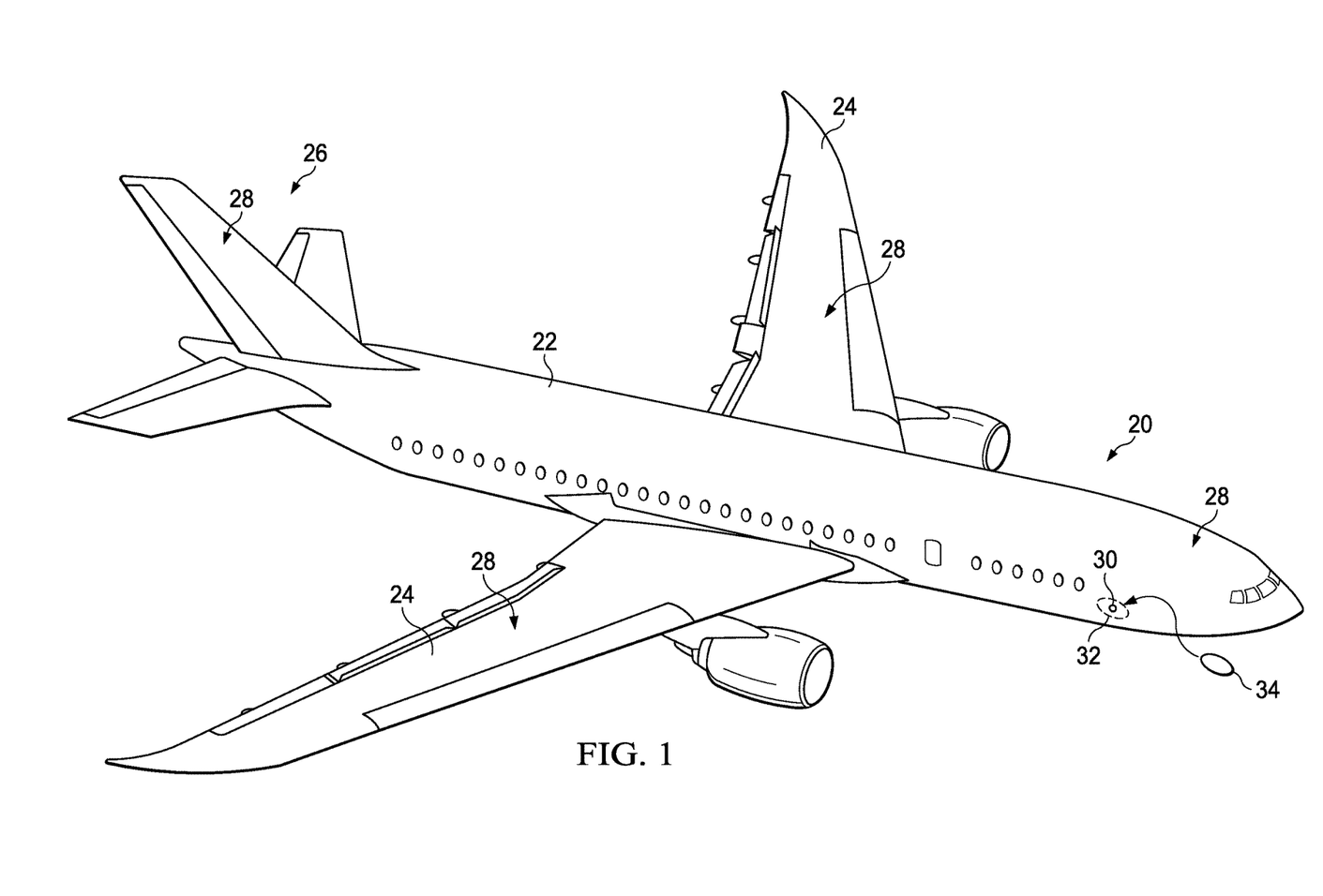
FIG. 1 is an illustration of a perspective view of an aircraft having a composite laminate skin requiring local rework to eliminate a non-conformity.
Figure 6:
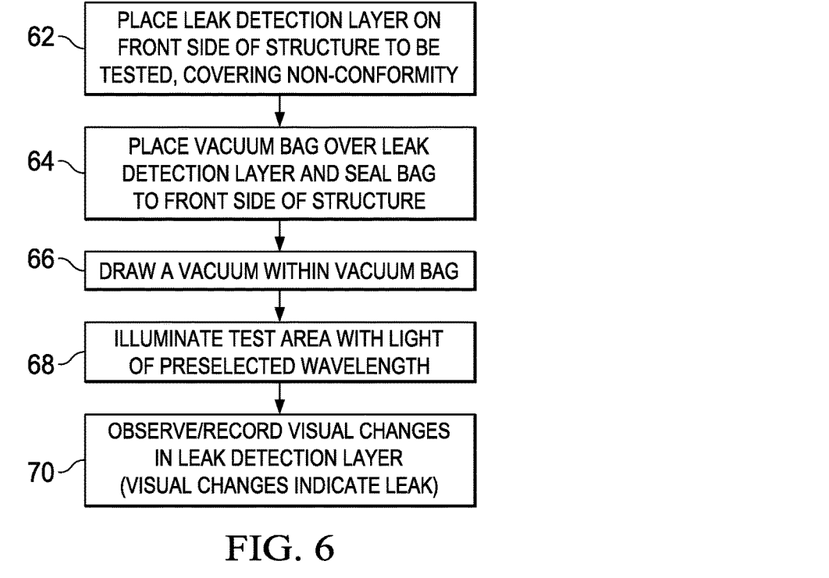
FIG. 6 is an illustration of a flow diagram of a method of detecting leaks through a structure from one side of the structure.

FIG. 6 illustrates the overall steps of a method of detecting leaks in a structure 28, such as a composite laminate skin 28 of the aircraft 20 shown in FIG. 1. Beginning at step 62, an LDL 50 is placed on the frontside 36 of the structure 28 to be tested, covering an area 32 that is to be potentially reworked to eliminate non-conformities therein. At step 64, a vacuum bag 52 is placed over the LDL 50 and sealed to the frontside 36 of the structure 28. At 66, a vacuum is drawn within the vacuum bag 52, and at step 68, the area being tested is illuminated with light having a preselected wavelength. At step 70, visual changes in the LDL 50 are observed or recorded which indicate the presence and location of an air leak 75 in the structure 28.

Figure 7:
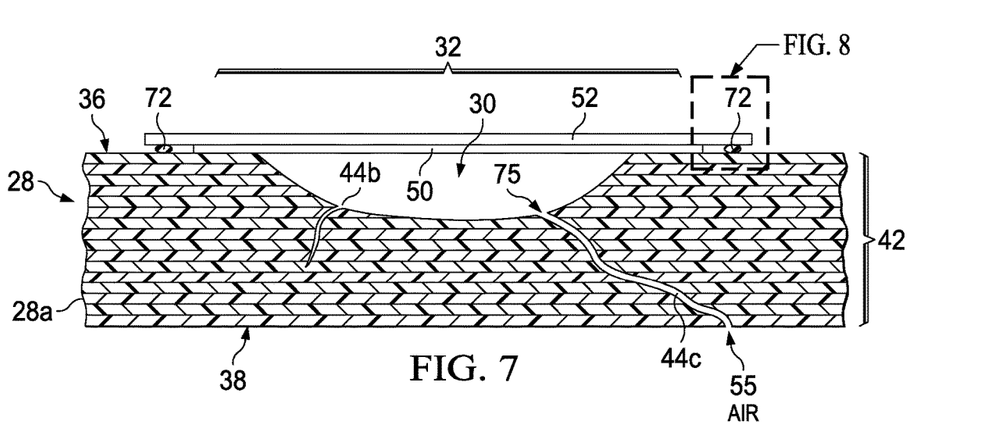
FIG. 7 is an illustration of a sectional view of an area of a composite skin having a void extending through the thickness of thereof, a leak detection layer and vacuum bag having been installed.
Figure 8:
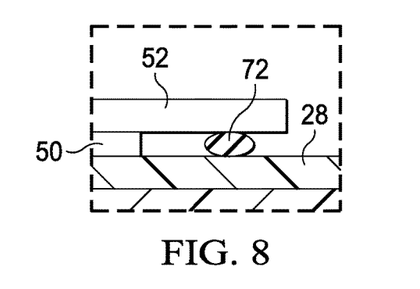
FIG. 8 is an illustration of the area designated as FIG. 8 in FIG. 7.

Attention is now directed to FIGS. 7-11 which sequentially illustrate the steps of a method of reworking a structure 28, such as the composite skin 28 of the aircraft 20 shown in FIG. 1 in order to eliminate non-conformities in the skin 28. Referring particularly to FIG. 7, an LDL 50 is placed over the frontside 36 of the structure 28 within an area 32 containing a non-conformity 30 which, in the illustrated example, comprises a dent. A vacuum bag 52 is then placed over the LDL 50 and sealed to the frontside 36 using seals 72. The vacuum bag 52 seals-off the LDL 50 from the surrounding, ambient atmosphere. In this example, the structure 28 contains a first void 44b which extends only partially through the thickness 42 of the structure 28, and a second void 44c that extends entirely through the thickness 42 to the backside 38, forming an air leak 75. Evacuation of the vacuum bag 52 draws air 55 in through the void 44c on the backside 38, thereby exposing the LDL to oxygen caused by the air leak 75. As previously discussed, the air leak 75 results in a localized change in the LDL 50 which is visually observable.

Figure 9:
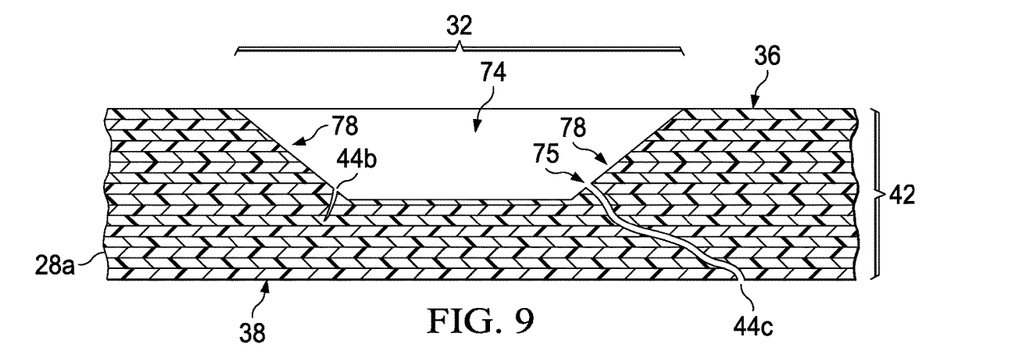
FIG. 9 is an illustration similar to FIG. 8, showing material having been removed from the rework area.
Figure 10:
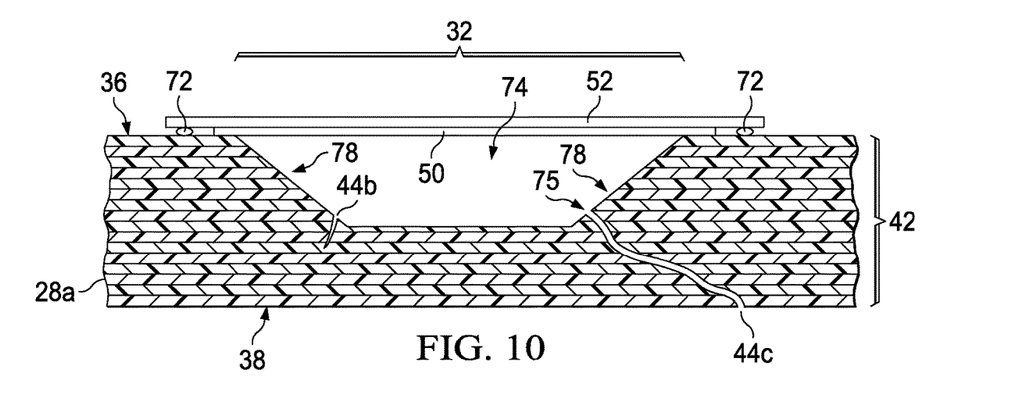
FIG. 10 is an illustration similar to FIG. 9 but showing a leak detection layer and vacuum bag having been installed on the frontside of the composite skin in order to re-test the rework area for leaks.

Referring now FIG. 9, after performing the leak detection described above in connection with FIG. 8, material is removed from the structure 28 in order to reduce or eliminate the non-conformity 30. The material removal process may be carried out using any of several known techniques, such as, for example and without limitation, scarfing the frontside 36 of the structure 28 using a suitable material removal process such as grinding or sanding. The scarfing operation results in a cavity 74 having tapered edges 78. Although a scarfing operation is illustrated, a material removal process may be followed that results in a cavity 74 having a stepped edge (not shown) in preparation for receiving a rework patch that forms a step lap joint (not shown). The material removal process described above may or may not eliminate one or more of the voids 44b, 44c. In the illustrated example, neither of the voids 44b, 44c is eliminated during the scarfing operation.

Following the scarfing shown in FIG. 9, the leak detection procedure may be repeated. Thus, referring to FIG. 10, an LDL 50 and the vacuum bag 52 are placed over the scarfed cavity 74, and the vacuum bag 52 is sealed by a seal 72 to the frontside 36 of the structure 28. A vacuum is drawn within the bag 52 and the rework area 32 is observed for possible leaks 75 caused by one or more voids 44 through the thickness 42 of the structure 28. In the illustrated example, the scarfing operation does not remove either of the voids 44b, 44c, consequently a leak will be detected as a result of air 55 being drawn in from the backside 38 through the void 44c which extends through the entire thickness 42.

Figure 11:
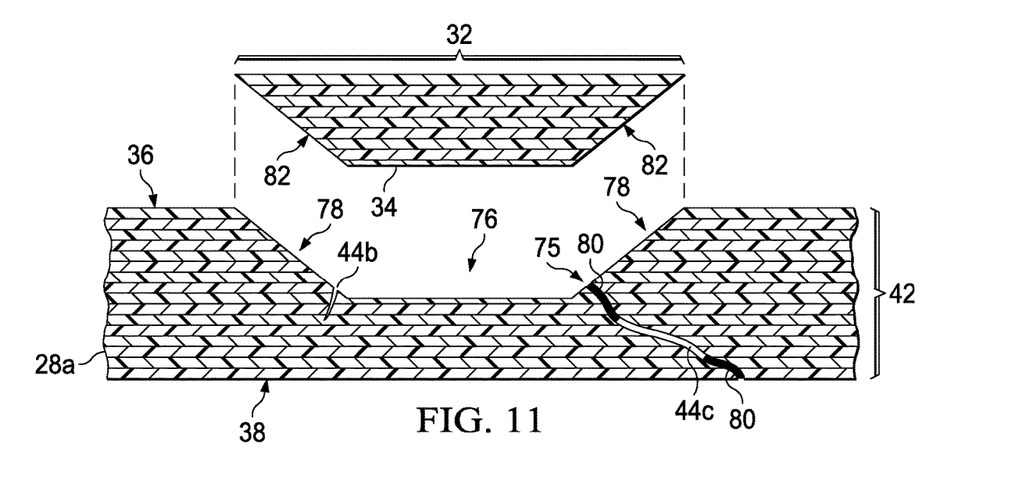
FIG. 11 is an illustration similar to FIG. 10 but showing the leak path having been sealed and a rework patch about to be installed.

Referring now to FIG. 11, if the leak detection procedure performed after the scarfing operation reveals any through-the-thickness air leaks 75, each air leak 75 may be sealed, as by injecting a sealant 80 into the void 44c, either from the frontside 36 or the backside 38 of the structure 28. Alternatively, in order to avoid air leaks 75 during subsequent curing of a rework patch 34, a vacuum bag (not shown) may be sealed to the backside 38 covering any through the thickness voids 44c. After the air leaks 75 are sealed or covered, a composite laminate rework patch 34 having tapered edges 82 may be placed in the cavity 76 and then cured. Since all air leaks 75 have been detected and sealed were covered, the possibility of air entering the rework patch 34 due to voids 44 that extend through the thickness 42 is substantially eliminated.

Figure 12:
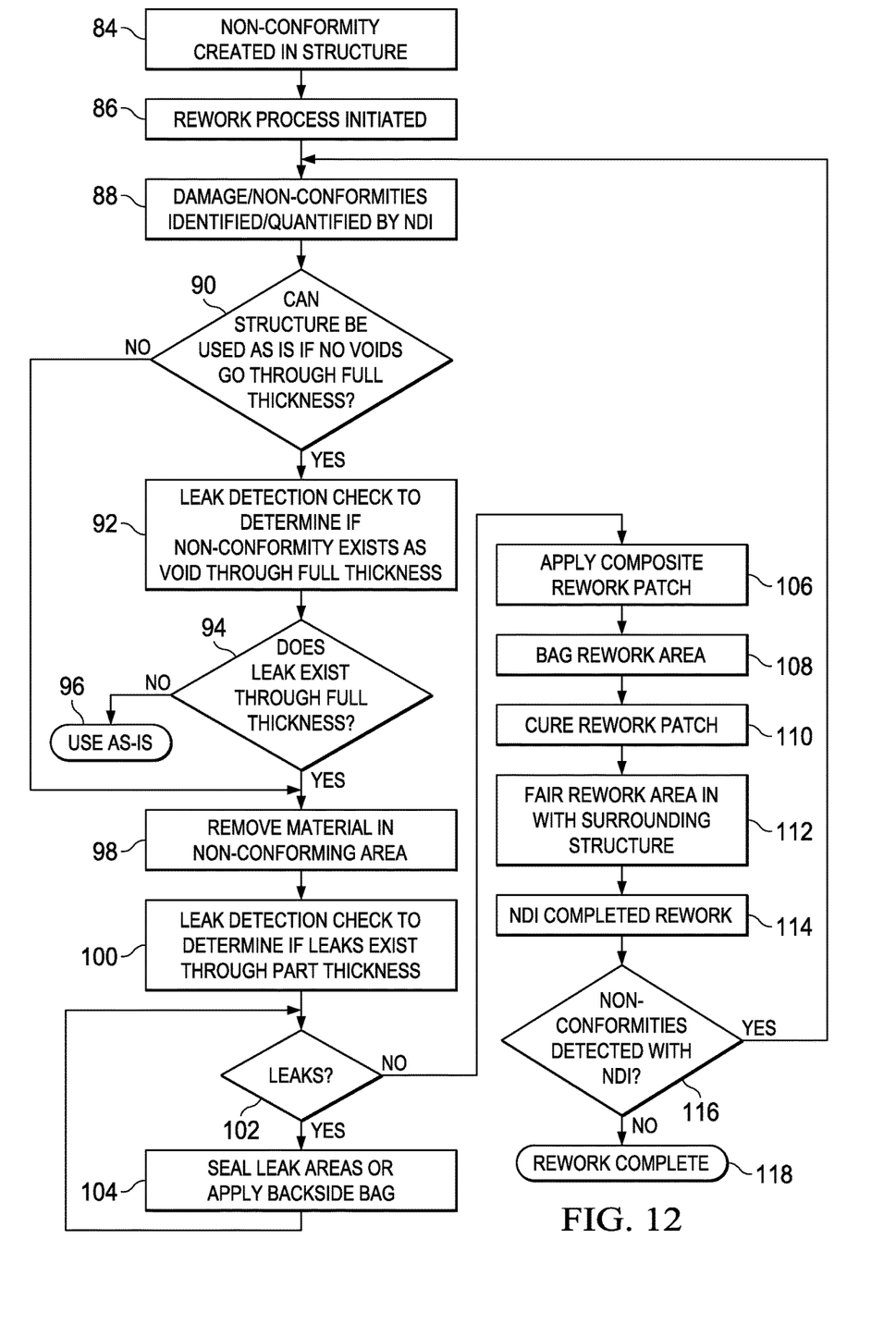
FIG. 12 is an illustration of a flow diagram of a method of leak detection and reworking a composite laminate aircraft skin.

Attention is now directed to FIG. 12 which broadly illustrates the steps of a process for evaluating and reworking composite structures in order to reduce or eliminate non-conformities 30. The process steps shown in FIG. 12 may avoid unnecessary rework of structures 28, and may help assure that a rework procedure, if required, is successful on the first attempt. At 84, one or more non-conformities 30 may be created in a structure 28, such as the composite laminate skin 28 previously discussed. At 86, a process is initiated for reworking the structure 28. At 88, non-conformities 30 or any damage to the structure 28 are identified and quantified by a suitable non-destructive inspection (NDI) technique. Some structures, even though impacted, can be used without being reworked with a patch and providing that the impact is sealed. Consequently, at 90, a determination may be initially made of whether the structure 28 can be used "as-is" with existing non-conformities, providing that no voids 44 exist that extend through the entire thickness 42 of the structure 28.

If the structure 28 is one that can be used as-is if no through-the-thickness voids 44 are present, then, at step 92, a leak detection operation is performed to determine if the non-conformity exists as a void 44 that does in fact extend through the full thickness 42 of the structure 28. At 94, if it is determined that the void 44 does not exist through the full thickness 42, then at 96, the structure 28 is used as-is. However, if it is determined at 94 that through-the-thickness void 44 exists, then the process continues at step 98 in which material is removed from a non-conforming area in order to reduce or eliminate non-conformities 30.

Following the material removal process at step 98, the leak detection process is repeated at step 100 to determine whether a through-the-thickness void 44 is present in the structure 28 after the material has been removed to eliminate non-conformities 30. The results of the leak detection test performed at 100 are evaluated at 102. If leaks are found at 102, then at 104, the voids 44 causing the leaks are either sealed, or a vacuum bag (not shown) is applied to the backside 38 of the structure in order to prevent air leaks into the rework area when a vacuum is drawn to compact and cure a rework patch 34. After it has been determined that there are no air leaks at 102, then a composite rework patch 34 may be applied to the rework area at step 106. At 108, a vacuum bag 52 is applied over the rework patch 34 and is sealed to the frontside 36 of the structure 28.

At step 110, the rework patch 34 is cured, as through the application of heat. Following curing of the rework patch 34 at 110, the rework area 32 is fared-in with the surrounding structure 28 at 112. It should be noted here that the composite rework patch 34 may be pre-cured before being applied to the at step 106. The pre-cured patch 34 may be bonded in place on the structure 28 using a suitable adhesive, in which case the curing carried out in step 110 involves curing the adhesive, rather than the patch 34 itself. In order to assure that non-conformities 30 have been removed, non-destructive inspection of the completed rework is performed at 114. As shown at step 116, if non-conformities 30 are detected by the inspection process at step 114, then the rework process is repeated, otherwise the rework process is terminated and is complete at 118.

Figure 13:
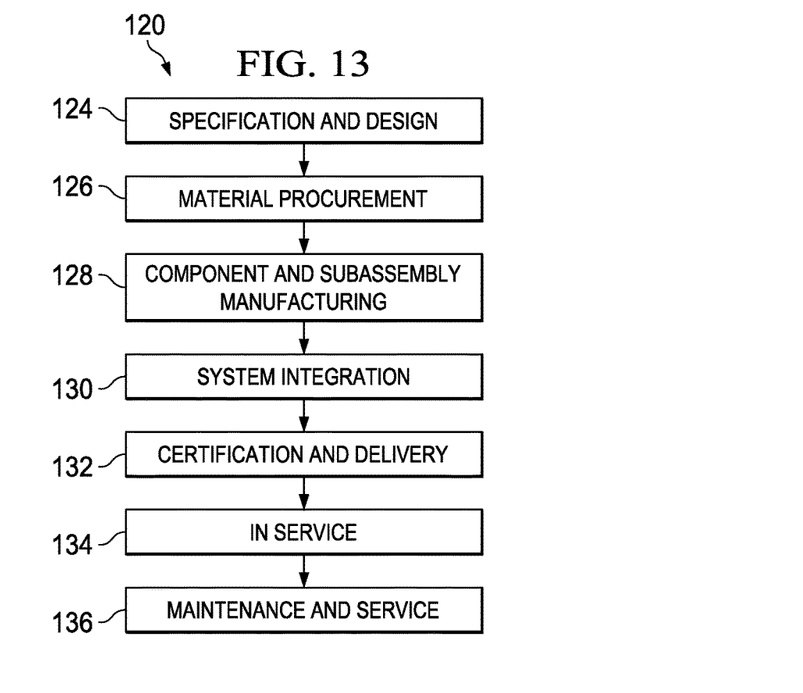
FIG. 13 is an illustration of a flow diagram of aircraft production and service methodology.
Figure 14:
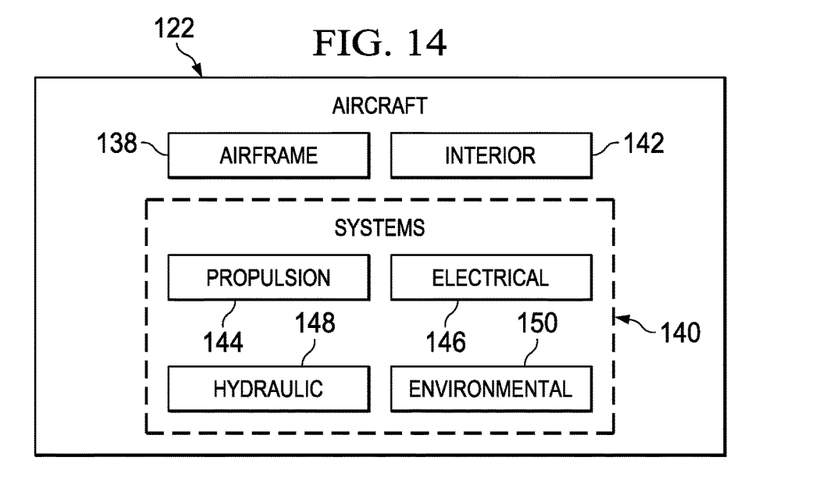
FIG. 14 is an illustration of a block diagram of an aircraft.

Embodiments of the disclosure may find use in a variety of potential applications, particularly in the transportation industry, including for example, aerospace, marine, automotive applications and other application where structures must be reworked in order to eliminate non-conformities. Thus, referring now to FIGS. 13 and 14, embodiments of the disclosure may be used in the context of an aircraft manufacturing and service method 120 as shown in FIG. 13 and an aircraft 122 as shown in FIG. 14. Aircraft applications of the disclosed embodiments may include, for example, without limitation, composite laminate skins, composite parts and composite subassemblies. During pre-production, exemplary method 120 may include specification and design 124 of the aircraft 122 and material procurement 126. During production, component and subassembly manufacturing 128 and system integration 130 of the aircraft 122 takes place. Thereafter, the aircraft 122 may go through certification and delivery 132 in order to be placed in service 134. While in service by a customer, the aircraft 122 is scheduled for routine maintenance and service 136, which may also include modification, reconfiguration, refurbishment, and so on. Also, while in service 134 the disclosed method may be employed to rework or repair various structural components, such as skins that have been altered through impacts or other events.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 122 produced by exemplary method 120 may include an airframe 138 with a plurality of systems 140 and an interior 142. Examples of high-level systems 140 include one or more of a propulsion system 144, an electrical system 146, a hydraulic system 148 and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 128 may be fabricated or manufactured in a manner similar to components or subassemblies produced while the aircraft 122 is in service. Also, one or more apparatus embodiments, method embodiments, or a combination thereof may be utilized during the production stages 128 and 130, for example, by substantially expediting assembly of or reducing the cost of an aircraft 122. Similarly, one or more of apparatus embodiments, method embodiments, or a combination thereof may be utilized while the aircraft 122 is in service, for example and without limitation, to maintenance and service 136.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of maintaining a composite laminate aircraft structure, comprising:
   identifying a non-conformity in an area of the structure;
   determining from a frontside of the structure whether a leak exists through a thickness of the structure within the area;
   if a leak has been determined to exist through the thickness of the structure, removing material from the structure within the area;
   determining from the frontside of the structure whether a leak exists through the thickness of the structure within the area after the material has been removed from the structure;
   if a leak has been determined to exist through the thickness of the structure after the material has been removed, sealing the leak; and
   installing a patch on the structure covering the area if material has been removed from the structure within the area.

2. The method of claim 1, wherein:
   if a leak has been determined not to exist through the thickness of the structure, then continuing to use the structure without reworking the area.

3. The method of claim 1, wherein:
   determining from the frontside of the structure whether the leak exists through the thickness of the structure within the area is performed by placing a leak detection layer over the area,
   generating a vacuum beneath the leak detection layer, and
   monitoring changes in the leak detection layer indicating a leak in the structure.

4. The method of claim 3, further comprising:
   placing a vacuum bag over the leak detection layer; and
   sealing the vacuum bag to the frontside of the structure.

5. The method of claim 3, wherein monitoring changes in the leak detection layer includes:
   radiating the area with light of a preselected wavelength, and
   using a camera to optically observe any changes in the leak detection layer.

* * * * *